United States Patent
Marchini et al.

(10) Patent No.: US 8,454,776 B2
(45) Date of Patent: Jun. 4, 2013

(54) METHOD AND APPARATUS FOR MANUFACTURING TYRES

(75) Inventors: Maurizio Marchini, Milan (IT);
Fiorenzo Mariani, Milan (IT);
Pierangelo Misani, Milan (IT); Marco Cantu', Milan (IT)

(73) Assignee: Pirelli Tyre S.p.A., Milan (IT)

( * ) Notice: Subject to any disclaimer, the term of this patent is extended or adjusted under 35 U.S.C. 154(b) by 741 days.

(21) Appl. No.: 12/083,932

(22) PCT Filed: Nov. 30, 2005

(86) PCT No.: PCT/IT2005/000704
§ 371 (c)(1),
(2), (4) Date: Apr. 2, 2009

(87) PCT Pub. No.: WO2007/063560
PCT Pub. Date: Jun. 7, 2007

(65) Prior Publication Data
US 2009/0211695 A1    Aug. 27, 2009

(51) Int. Cl.
*B29D 30/10* (2006.01)
(52) U.S. Cl.
USPC .................. 156/117; 156/245; 156/397
(58) Field of Classification Search
USPC ............ 156/117, 245, 397, 414, 417; 425/48
See application file for complete search history.

(56) References Cited

U.S. PATENT DOCUMENTS

| | | | | |
|---|---|---|---|---|
| 3,824,048 A * | 7/1974 | Getz | ............................ | 425/28.1 |
| 4,236,883 A * | 12/1980 | Turk et al. | ........................ | 425/32 |
| 4,359,340 A * | 11/1982 | Comper et al. | ............ | 106/38.22 |
| 4,744,931 A * | 5/1988 | Trapp | .............................. | 264/40.5 |
| 5,853,526 A | 12/1998 | Laurent et al. | | |
| 6,203,641 B1 | 3/2001 | Laurent et al. | | |
| 6,328,084 B1 * | 12/2001 | Caretta et al. | ................. | 152/541 |
| 6,398,893 B1 * | 6/2002 | Shida | ............................. | 156/130 |
| 6,682,687 B1 * | 1/2004 | Mitamura et al. | ............ | 264/486 |
| 6,757,955 B2 | 7/2004 | Scarzello et al. | | |
| 2002/0174939 A1 | 11/2002 | Caretta et al. | | |

FOREIGN PATENT DOCUMENTS

| | | | |
|---|---|---|---|
| EP | 0604984 A1 * | 7/1994 | |
| EP | 1 541 325 A2 | 6/2005 | |
| EP | 1 541 325 A3 | 6/2005 | |
| JP | 9-48026 | 2/1997 | |
| WO | WO 01/00395 A1 | 1/2001 | |

\* cited by examiner

*Primary Examiner* — Michael Tolin
(74) *Attorney, Agent, or Firm* — Finnegan, Henderson, Farabow, Garrett & Dunner, L.L.P.

(57) ABSTRACT

A green tire is built on a rigid toroidal support externally having a forming surface of a conformation corresponding to an inner conformation of the tire. The built tire is removed from the rigid toroidal support and engaged on an expandable toroidal support which includes a bladder. The green tire engaged on the expandable toroidal support is introduced into a vulcanization mold and submitted to a vulcanization cycle.

22 Claims, 6 Drawing Sheets

US 8,454,776 B2

METHOD AND APPARATUS FOR MANUFACTURING TYRES

CROSS REFERENCE TO RELATED APPLICATION

This application is a national phase application based on PCT/IT2005/000704, filed Nov. 30, 2005, which is incorporated herein by reference.

BACKGROUND OF THE INVENTION

1. Field of the Invention

The present invention relates to a method and an apparatus for manufacturing tyres.

2. Description of the Related Art

A tyre for vehicle wheels generally comprises a carcass structure including at least one carcass ply having respectively opposite end flaps in engagement with respective annular anchoring structures, integrated into the regions usually identified as "beads".

Associated with the carcass structure is a belt structure comprising one or more belt layers, disposed in radial superposed relationship with respect to each other and to the carcass ply and having textile or metallic reinforcing cords with a crossed orientation and/or substantially parallel to the circumferential extension direction of the tyre. Applied to the belt structure at a radially external position is a tread band also made of elastomeric material like other semifinished products constituting the tyre.

It is to be pointed out, to the aims of the present description, that by the term "elastomeric material" it is intended a composition comprising at least one elastomer polymer and at least one reinforcing filler. Preferably, this composition further comprises additives such as cross-linking agents and/or plasticizers, for example. Due to the presence of the cross-linking agents, this material can be cross-linked through heat so as to form the final manufactured article.

Respective sidewalls of elastomeric material are also applied to the side surfaces of the carcass structure, each extending from one of the side edges of the tread band until close to the respective annular anchoring structure to the beads. In tyres of the tubeless type, an airtight coating layer, usually called "liner" covers the inner surfaces of the tyre.

Generally, in the manufacture of tyres for vehicle wheels it is provided that subsequently to building of the green tyre through assembly of the respective components, a moulding and curing treatment be carried out which aims at determining the structural stabilisation of the tyre through cross-linking of the elastomeric compositions and also at forming a desired tread pattern thereon, as well as possible graphic distinctive marks at the tyre sidewalls.

Manufacturing processes of recent conception are known in which building of the green tyre is carried out by making the different components thereof on a rigid toroidal support, the conformation of which is coincident with the inner conformation of the finished tyre. For achieving the moulding and curing treatment, the green tyre is enclosed in the moulding cavity of a vulcanisation mould of a shape matching the outer conformation to be given to the finished tyre, together with the toroidal support on which the tyre itself has been build.

WO 01/00395, in the name of the same Applicant, discloses use of a toroidal support having an outer diameter slightly smaller than the inner diameter of the finished tyre. The crown portion of the tyre is moulded against the inner surface of the moulding cavity following a radial expansion induced by steam under pressure introduced into a diffusion interspace defined between the toroidal support and the inner surface of the tyre itself.

U.S. Pat. No. 5,853,526 discloses building of a tyre carried out through formation of the different components on an expandable toroidal support comprising a reinforced bag the inner end flaps of which are sealingly fastened to mutually coaxial anchoring flanges which are integral with two half-shafts telescopically in engagement with each other. The reinforced bag, inflated to a predetermined pressure, keeps a predetermined geometric structure corresponding to the inner conformation of the tyre to be built, so that it lends itself to support the components of the tyre being processed. When building has been completed, the tyre is shut up in the vulcanisation mould together with the expandable toroidal support. The reinforced bag is adapted to receive steam or other working fluid under pressure, to cause pressing of the tyre against the inner surfaces of the moulding cavity and simultaneous heat supply to the tyre itself to achieve vulcanisation.

In practical implementation of said processes, the Applicant could observe some difficulties correlated with the moulding and curing treatment of the tyre.

In a tyre vulcanisation and moulding process as the one disclosed in WO01/00395, an "imposed-volume" moulding is required on wide regions of the tyre, by way of indication extending from the tyre beads along the sidewalls, until the shoulders.

SUMMARY OF THE INVENTION

The Applicant could observe that in "imposed-volume" moulding the different tyre parts must show a geometry substantially identical with that of the spaces that, when the mould is closed, are confined between the toroidal support and the inner surfaces of the moulding cavity, inferring therefrom that in such a process precise work tolerances are required in forming the individual components during building of the tyre itself.

The Applicant could also ascertain the necessity to adopt particular expedients to prevent steam introduced into the green tyre from seeping into the liner structure coating the inner tyre surfaces, thereby impairing the structural tyre integrity.

In addition, the Applicant could find that an expandable toroidal support of the type disclosed in U.S. Pat. No. 5,853,526 has a great manufacture complexity, and sophisticated arrangements for control of the inflating pressure of the bag are required to ensure the geometric and dimensional steadiness of said bag during the whole tyre building process. In addition, manufacture of the reinforced bag itself is very complicated and said bag is submitted to such important thermal and mechanical stresses that replacement of same is required after some vulcanisation cycles.

It was also ascertained by the Applicant that the high number of expandable toroidal supports required for operation of a building plant under normal working conditions involves heavy investments and high management and servicing costs.

In accordance with the present invention, the Applicant has become aware of the possibility of improving the final product quality while at the same time achieving an important simplification of the plants and the production processes through building of the tyre on a rigid toroidal support to transfer then the green tyre onto a toroidal support provided with an expandable bladder to be introduced into the mould together with the tyre itself to carry out the moulding and curing treatment thereon.

In more detail, in a first aspect, the present invention relates to a method of manufacturing tyres comprising the steps of: building a green tyre on a rigid toroidal support externally having a forming surface of a conformation corresponding to the inner conformation of the built green tyre; removing the built green tyre from the rigid toroidal support; engaging the green tyre on an expandable toroidal support comprising at least one bladder; introducing the green tyre engaged on the expandable toroidal support into a vulcanisation mould; curing the tyre enclosed in the vulcanisation mould.

To enable easy removal of the rigid toroidal support from the green tyre without impairing the geometric and structural integrity of the tyre, the rigid toroidal support is preferably provided to be made of a plurality of circumferential sectors in engagement with each other in a removable manner, in a circumferential mutual alignment relationship.

For the same reason, said forming surface is preferably provided to be substantially exempt from concavities or undercuts.

In more detail, to this aim the rigid toroidal support may advantageously be adapted to engage the tyre beads at the so-called "tyre seats" axially spaced apart by a distance higher than 95% of the maximum axial distance measurable on the forming surface.

In fact, by carrying out tyre building on a rigid toroidal support, a great structural and dimensional accuracy of the built tyre is ensured without resorting to the sophisticated expedients required for manufacturing the reinforced bags of the known art and for controlling the geometric and dimensional features of same through a constant management of the inflating pressure.

Carrying out the moulding and vulcanisation step through an expandable bladder enables a high quality product to be obtained with an important simplification of the production processes and a reduction in the work scraps.

In addition, carrying out pressing by means of the bladder allows less narrow tolerances to be adopted during formation of the tyre components for building of the tyre itself. In fact the bladder can adapt itself to the tyre conformation and compensate for possible geometric and dimensional inaccuracies close to the sidewalls, without encountering the problems correlated with an "imposed-volume" moulding, arising when a rigid toroidal support is used in the moulding and curing treatment.

Furthermore the bladder is adapted to enable a spreading action eliminating possible surface discontinuities on the inner tyre surfaces.

The bladder associated with the expandable toroidal support must not bear the tyre during the building process, and therefore a reinforced or particularly sophisticated structure is not required. Therefore a low-cost bladder can be associated with the expandable toroidal support so that periodical replacement of the bladder does not involve high expenses.

In a plant made in accordance with the present invention, a reduced number of expandable toroidal supports is required, i.e. the number strictly necessary for bearing the tyres submitted to the moulding and curing process, since the tyres along the building line are supported by rigid toroidal supports.

Advantageously, the expandable toroidal support also lends itself to be submitted to lubricating treatments aiming at increasing surface smoothness between the bladder and the inner surfaces of the tyre.

The possibility of carrying out the above treatments directly on the expandable toroidal support externally of the vulcanisation mould, instead of carrying them out on the inner surfaces of the tyre or internally of the vulcanisation mould greatly reduces the risks of contamination of the tyre and/or the mould with the lubricating materials used in executing said treatment.

In a further aspect the invention relates to an apparatus for manufacturing tyres, comprising: at least one rigid toroidal support externally having a forming surface of a conformation corresponding to the inner conformation of the built green tyre; devices for building a green tyre on the rigid toroidal support; at least one expandable toroidal support comprising at least one bladder; devices for removing a built green tyre from the rigid toroidal support; devices for engaging the built green tyre on the expandable toroidal support; devices for introducing the built green tyre engaged on the expandable toroidal support into a vulcanisation mould; devices fur curing the tyre enclosed in the vulcanisation mould.

BRIEF DESCRIPTION OF THE DRAWINGS

Further features and advantages will become more apparent from the description of a preferred, but not exclusive embodiment of a method and an apparatus for manufacturing tyres in accordance with the present invention. This description will be set out hereinafter with reference to the accompanying drawings, given by way of non-limiting example, in which.

DETAILED DESCRIPTION OF THE INVENTION

Figure 1:
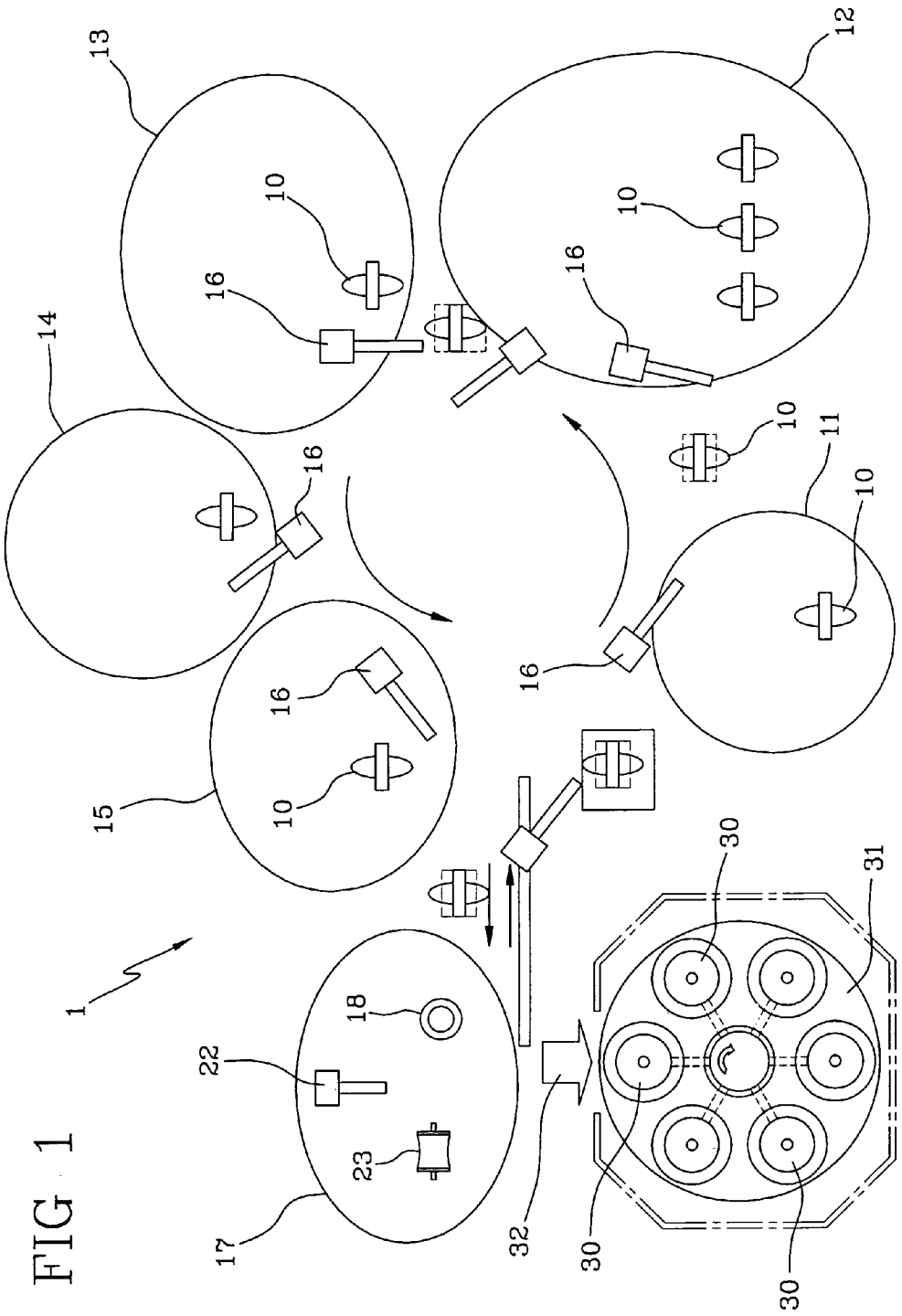
FIG. 1 diagrammatically shows a top view of an apparatus for manufacturing tyres in accordance with the present invention.

With reference to the drawings, an apparatus for tyre manufacture in accordance with the present invention has been generally identified by reference numeral 1.

Apparatus 1 is designed to manufacture tyres 2 (FIG. 2) essentially comprising at least one carcass ply 3 internally coated with a layer of an airtight elastomeric material, a so-called liner 4, two annular anchoring structures 5a in engagement with the circumferential edges of the carcass ply in the vicinity of the regions usually identified as "beads" 5, a belt structure 6 circumferentially applied to the carcass ply 3, a tread band 7 circumferentially superposed on the belt structure 6, and two sidewalls 8 applied to the carcass ply 3 at laterally opposite positions and each extending from the corresponding bead 5 to the corresponding side edge of the tread band 7.

Apparatus 1 essentially comprises devices for building tyres 2 operating along a building line altogether identified by 9, and devices for curing the tyres built along the building line 9.

The building line 9 may for example comprise a plurality of building stations 11, 12, 13, 14, 15 distributed along the building line 9 and each set to form a component of the tyre 2 being processed directly on a rigid toroidal support 10 having a forming surface 10a with a conformation corresponding to the inner conformation of the green tyre 2 when building has been completed. In more detail, by way of example, a first station 11 may be provided in which liner 4 is formed through winding of a continuous elongated element of elastomeric material into coils disposed close to each other and distributed along the forming surface 10a of the toroidal support 10. In at least one second building station 12 one or more carcass plies 3 can be formed and they are obtained through laying of strip-like elements cut off from a continuous strip of elastomeric material comprising textile or metallic cords disposed in parallel side by side relationship. A third building station 13 can be dedicated to manufacture of the annular anchoring structures 5a integrated into the tyre beads 5 through laying of at least one continuous elongated element comprising at least one rubberised metal cord, in the form of radially superposed coils. At least one fourth building station 14 may be dedicated to manufacture of the annular belt structure 6 obtained by laying in a circumferentially-approached relationship, strip-like elements cut off from a continuous strip of elastomeric material comprising mutually parallel preferably metallic cords, and/or through winding of at least one preferably metallic rubberised reinforcing cord into coils disposed in axial side by side relationship, in the crown portion of tyre 2. At least one fifth building station 15 can be set for manufacture of the tread band 7 and the sidewalls 8. Tread band 7 and sidewalls 8 are preferably obtained through winding of at least one continuous elongated element of elastomeric material into coils disposed in mutual side by side relationship.

The building stations 11, 12, 13, 14, 15 distributed along the building line 9 can each simultaneously operate on a respective tyre 2 being processed, carried by a respective rigid toroidal support 10, sequentially transferred from a building station to the next one, through robotized arms 16 or other suitable devices.

Figure 2:
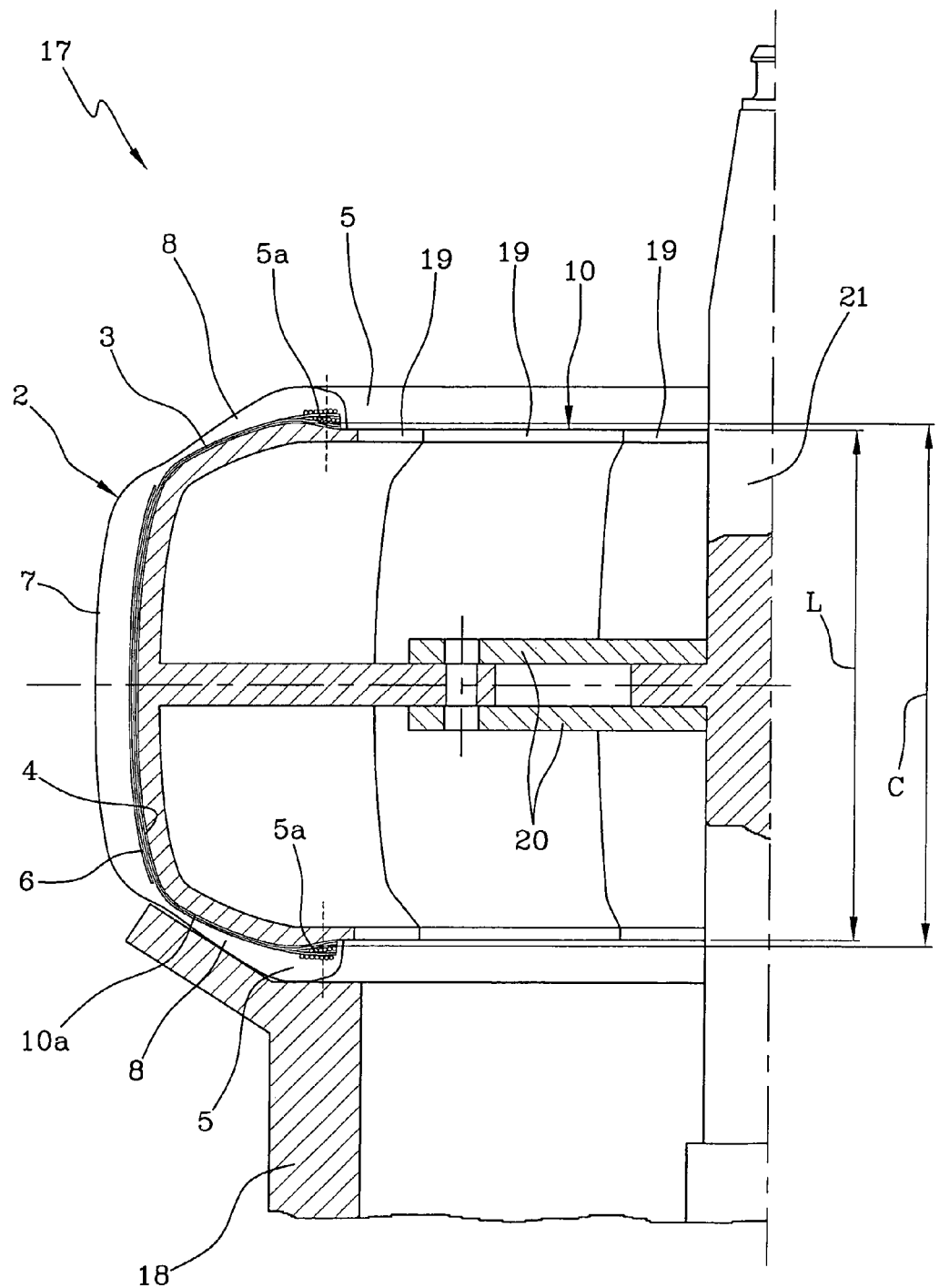
FIG. 2 is a diametrical section view of a tyre disposed on a rigid toroidal support, at the end of the tyre building cycle.

When building has been completed, the tyre 2 being processed reaches a transfer station 17 equipped with devices 22 adapted to remove the rigid toroidal support 10 from said tyre, tyre 2 being preferably positioned on a suitable support base 18, as shown in FIG. 2.

To enable release from tyre 2, the rigid toroidal support 10 is preferably provided to have a dismountable structure, made up of a plurality of circumferential sectors 19 disposed in mutual circumferential alignment. The circumferential sectors 19 are interconnected with each other by a removable interconnecting flange 20 carrying at least one grip shank 21 to be utilised in order to enable handling of the toroidal support 10 between the different building stations 11, 12, 13, 14, 15. The removal devices 22 may for example comprise a robotized arm set to remove the interconnecting flange 20 and then individually pick up the circumferential sectors 19 in succession to take them away from the inside of tyre 2 with a combined oscillation and translation movement substantially directed radially to the geometric rotation axis of the tyre 2 itself, as described in U.S. Pat. No. 6,757,955 in the name of the same Applicant, for example.

To facilitate removal of the toroidal support 10 without any risk of impairing the geometric and structural integrity of the green tyre 2, the forming surface 10a of the toroidal support 10 and therefore the inner surface of the built tyre 2 are preferably provided to be substantially exempt from concavities or undercuts that can hinder extraction of the circumferential sectors 10 from the inside of tyre 2. In more detail, to this aim it is provided that the bead seats 10b arranged on the toroidal support 10 be axially spaced apart by a distance "L" preferably greater than or equal to the value of the maximum chord "C" of the forming surface 10a, i.e. the maximum axial distance measurable between axially opposite portions of the forming surface 10a, in parallel to the geometric axis X-X of the toroidal support 10 itself. An axial distance L between the bead seats 10b that is slightly smaller than the maximum chord C, as shown in FIG. 2 for example, is also acceptable. However, preferably, the amount of the axial distance L between the bead seats 10b must be higher than 95% of the above specified maximum axial distance.

In this way it is advantageously possible to remove the rigid toroidal support 10 from the built tyre 2 without any risk of impairing the geometric and structural integrity of the tyre 2 in spite of the fact that the latter, being still in a green state, has a very delicate and easily deformable structure when submitted to stresses even of small amount.

The same robotized arm 22 as used for removal of the rigid toroidal support 10, or other suitable device operating in the transfer station 17 or other adjacent work station carries out engagement of the built green tyre 2 previously removed from the rigid toroidal support 10, on an expandable toroidal support 23.

The expandable toroidal support 23 essentially comprises an elastically deformable bladder 24 having a main portion 24a in the form of a layer, made of elastomeric material substantially devoid of textile or metallic reinforcing inserts and carrying opposite circumferential edges 24b integrating possible circumferential anchoring inserts sealingly engaged with respective flanges 25 facing each other in coaxial relationship.

The flanges 25 are mutually interconnected by a centring member preferably comprising at least one shank 26 projecting in axially opposite directions from said flanges 25. Longitudinally formed in the centring shank 26, preferably starting from an end of the latter, is an inflow duct 27 radially opening between the flanges 25, into the bladder 24.

Figure 3:
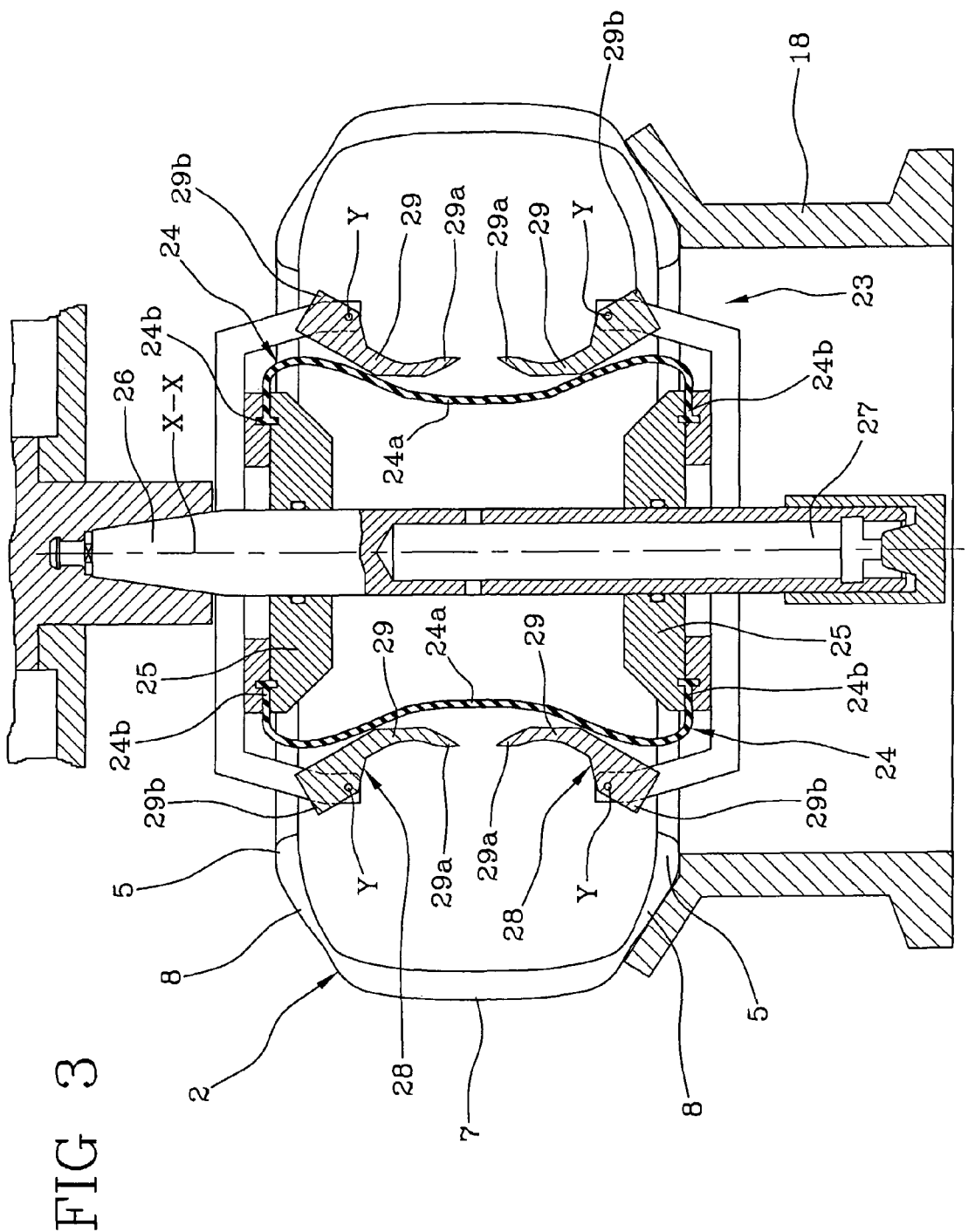
FIG. 3 shows a step of introducing an expandable toroidal support into the green tyre disengaged from the rigid toroidal support.
Figure 4:
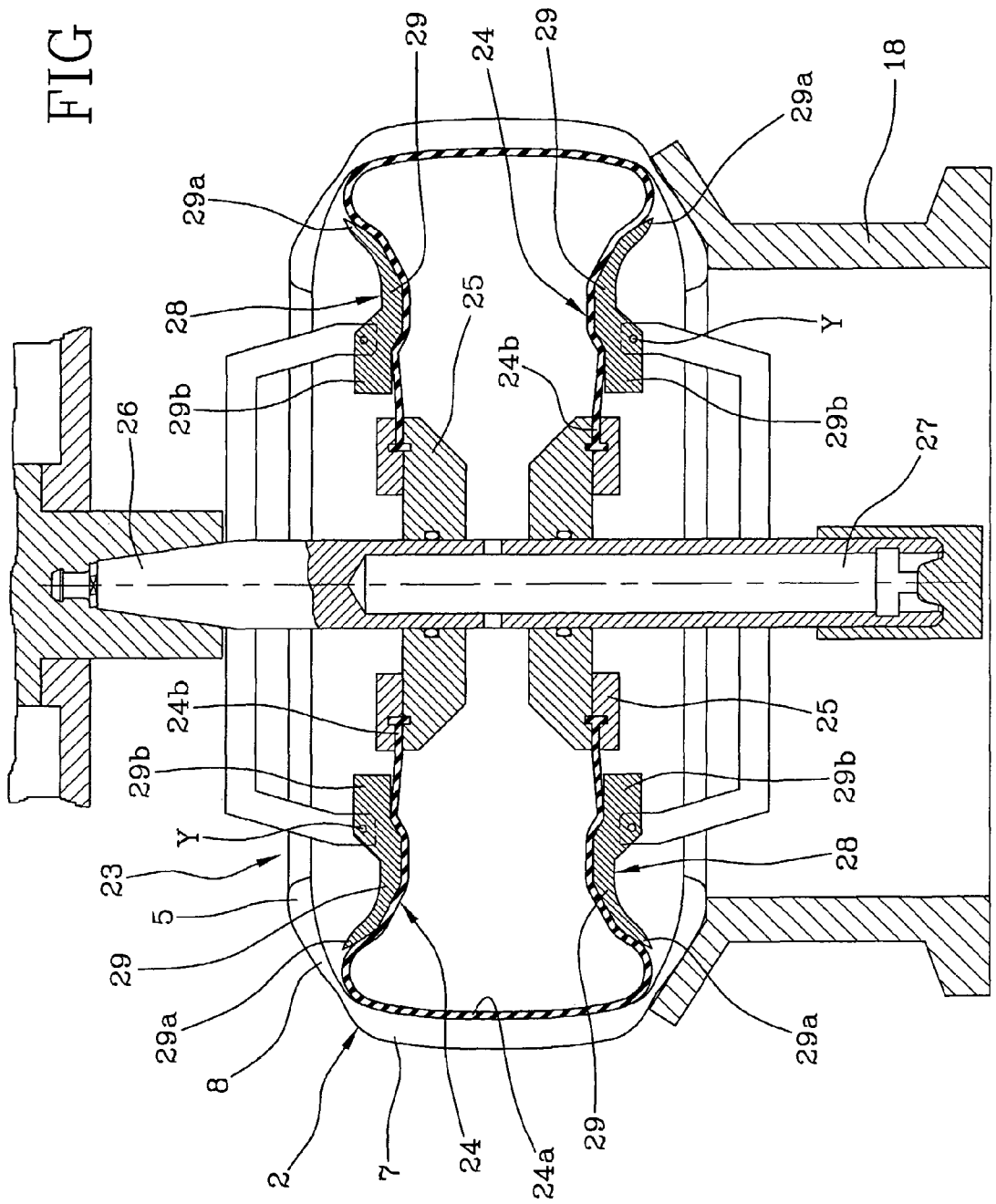
FIG. 4 shows a step of expanding the expandable toroidal support internally of the green tyre.
Figure 5:
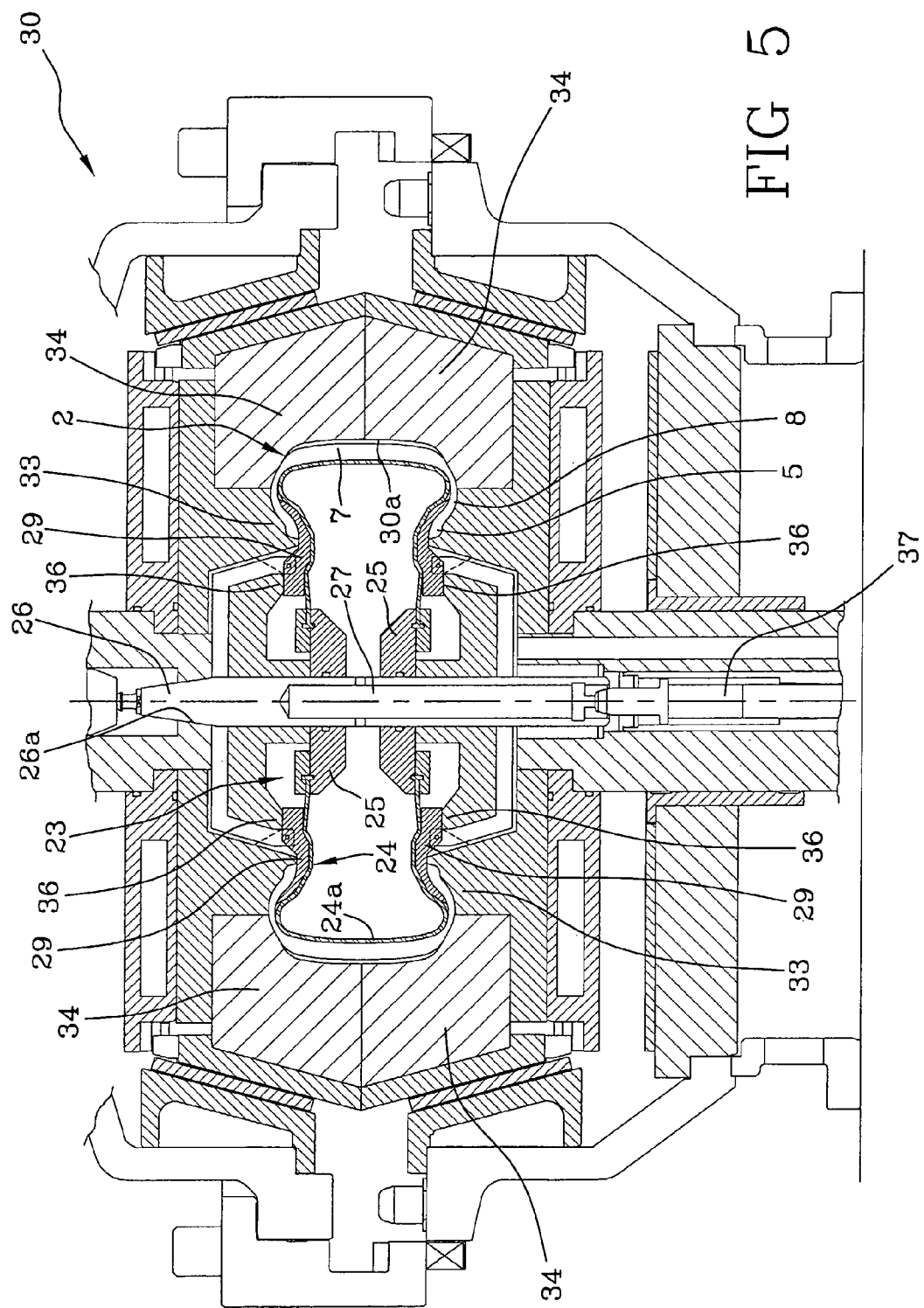
FIG. 5 shows the tyre enclosed in a vulcanisation mould together with the expandable toroidal support.

By introduction of a fluid under pressure through the inflow duct 27, the bladder 24 lends itself to be deformed from a rest condition, at which it has a substantially cylindrical conformation as shown in FIG. 3, to a work condition at which it is elastically expanded until it acts against the inner surface of the tyre 2 being processed, as viewed from FIGS. 4 and 5.

Also peripherally associated with each of flanges 25 is a counter-ring 28 comprising a plurality of counter-sectors 29 rotatably hinged in the vicinity of the circumferential edge of the flange 25 itself, each according to a rotation axis Y substantially tangent to a circumferential line concentric with the geometric axis X-X of the expandable toroidal support 23 and passing through the hinge point. The counter-sectors 29 are simultaneously movable between a rest position and an operating position, in accordance with deformation of bladder 24 from the rest condition to the work condition. In the work condition, the counter-sectors 29 are oriented substantially at right angles to the axis X-X of the expandable toroidal support 23, as shown in FIG. 4, and have respective end edges 29a consecutively disposed along a circumferential alignment direction radially external to the respective flange 25. In the rest position, the counter-sectors 29 are oriented substantially parallel to the axis X-X of the expandable toroidal support 23, as shown in FIG. 3, with the respective end edges 29a positioned at a radially inner location with respect to said circumferential alignment direction, to enable the bladder 24 to take a substantially cylindrical conformation in a rest condition.

For purposes that will become more apparent in the following, each counter-sector 29 has an abutment tailpiece 29b projecting from the rotation axis Y of the counter-sector 29 itself, on the opposite side from the end edge 29a.

In the embodiment shown, the counter-rings 28 are positioned externally of bladder 24 and the respective counter-sectors 29 are pushed from the rest position to the operating position following expansion of the bladder 24. When the bladder 24 is brought back from the work condition to the rest condition, each counter-sector 29 is free to rotate to the respective rest position, possibly pushed by torsion springs or other spring means associated with the counter-rings 28.

Alternatively, the counter-rings 28 can operate within the bladder 24. In this case, shrinkage of the bladder 24 to the rest condition causes orientation of the counter-sectors 29 to the rest position. Following deformation of bladder 24 to the work condition, the counter-sectors 29 are free to rotate to the operating position, possibly urged by torsion springs or other spring means associated with the counter-rings 28. To achieve engagement of the built green tyre 2, the expandable toroidal support 23 with the bladder 24 in the rest condition is coaxially introduced into the tyre 2 preferably positioned on the same support base 18 as used during the step of removing the rigid toroidal support 10 therefrom, as shown in FIG. 3. More particularly, the expandable toroidal support 23 is axially positioned in such a manner that bladder 24 is substantially centred in an axial direction relative to the rotation axis of tyre 2. Subsequently, introduction of nitrogen or other working fluid into the bladder 24 is enabled, to cause elastic expansion of bladder 24 from the rest condition to the work condition, concurrently with a possible mutual approaching of flanges 25, slidable along the centring shank 26. When bladder 24 comes into contact with the inner surface of tyre 2, admission of the working fluid is stopped. The material forming bladder 24 and the thickness of same are such selected as to obtain a sufficiently steady engagement between tyre 2 and bladder 24 on reaching of an inner pressure that, just as an indication, does not exceed about 1 bar, and is preferably in the order of about 0.5 bar (the pressure values stated in the present description are to be intended as values of gauge pressure with respect to the atmospheric pressure), so as to avoid stresses capable of causing undesirable deformations to the green tyre 2. It is to be noted that once engagement has occurred the sidewalls 8 and beads 5 of tyre 2, due to the conformation they are given during building, can keep an opened wide orientation relative to the expandable toroidal support 23, the shape of which in an operating condition is substantially conformable to the inner configuration of the finished tyre 2, at least close to the beads.

Through the same transfer device 22 as used for engagement between the expandable toroidal support 23 and tyre 2, or other suitable equipment, the expandable toroidal support 23 and the green tyre 2 engaged thereon are introduced into a vulcanisation mould 30 being part of the above mentioned vulcanisation devices.

In the embodiment shown in FIG. 1 a plurality of vulcanisation moulds 30 is provided, which moulds are disposed in a rotatable structure 31 in such a manner as to be sequentially brought to a loading/unloading position 32 where removal of the cured tyre 2 is carried out, followed by introduction of a new green tyre 2 coming from the building line 9.

Each vulcanisation mould 30 essentially has a pair of axially opposite plates 33 set to operate on the beads 5 and sidewalls 8 of tyre 2, and a plurality of moulding sectors 34 set to operate against the tread band and defining, together with plates 33, a moulding cavity 30*a* of a conformation corresponding to the outer conformation to be given to the cured tyre 2. Preferably, the moulding cavity 30*a* has slightly bigger diametrical sizes than the diametrical sizes of the green tyre 2.

During introduction of tyre 2 into the mould 30, the centring shank 26 carried by the expandable toroidal support 23 is inserted in at least one centring seat 26*a* arranged in the vulcanisation mould 30, to ensure a centred positioning of tyre 2 within the mould 30 itself.

Then starting of a vulcanisation cycle on tyre 2 takes place. To this aim, the vulcanisation mould 30 is closed through axial approaching of the axially opposite plates 33 and simultaneous radial approaching of the moulding sectors 34. Following closure of mould 30, the sidewalls 8 and beads 5 of tyre 2, previously disposed in an opened wide orientation, are moved axially close to each other relative to the rigid toroidal support 10.

On closure of the mould 30, abutment seats 36 circumferentially distributed on the plates 33 act against the abutment tailpieces 29*b* of the counter-sectors 29 belonging to the counter-rings 28. Consequently, movement of the counter-sectors 29 to the rest position is inhibited. Under this circumstance, the counter-rings 28 lend themselves to efficiently act against the inner surfaces of tyre 2, particularly at the beads 5 and the radially internal part of the sidewalls 8, to counteract the axial thrust exerted by the plates 33 during the final step of closing mould 30. The tyre beads and the radially internal part of the sidewalls are therefore compressed between the plates 33 of mould 30 and the counter-rings 28, and consequently submitted to an efficient "imposed-volume" moulding action according to a well defined geometric configuration capable of eliminating possible surface unevennesses given to the beads 5 and sidewalls 8 during the building step, due for example to the above described laying of elongated elements of elastomeric material in the form of coils disposed close to each other.

When closure of the mould 30 has been completed, a vulcanisation fluid is fed to the inside of bladder 24 through a feeding circuit 37 opening into the vulcanisation mould 30 and adapted to be operatively coupled with the inflow duct 27 formed in the expandable toroidal support 23.

Control devices not described or shown as they can be made in any convenient manner, operate on the feeding circuit 37 to manage supply of the vulcanisation fluid according to two vulcanisation stages in succession. A first vulcanisation stage aims at obtaining consolidation of the beads of tyre 2, while a second stage aims at determining full vulcanisation of tyre 2.

To this aim, in the first vulcanisation stage the vulcanisation fluid, such as steam, nitrogen, a mixture thereof or any other suitable fluid, preferably steam, is preferably provided to be fed to a pressure included, by way of indication, between about 1 bar and about 2.5 bars, equal to about 2 bars, for a period of time included, just as an indication, between about 2 and about 6 minutes, equal to about 3 minutes for example. The supply pressure of the vulcanisation fluid during the first vulcanisation stage is adapted to enable a suitable heat transmission to the tyre beads through the counter-rings 28, which pressure however is not high enough to cause pressing of tyre 2 against the inner walls of mould 30, particularly at the radially external regions of the same. Due to the amount of heat transmitted through the plates 33 of mould 30 and the counter-rings 28, by effect of the vulcanisation fluid admitted into the expandable bladder, a cross-linking localised at the beads 5 is thus obtained and possibly in the radially internal portions of the sidewalls 8, of such a nature as to cause a sufficient consolidation of the beads without giving rise to an important cross-linking of the radially external parts of tyre 2 extending, just as an indication, from the tread band 7 and on the radially external portion of the sidewalls 8.

Subsequently, starting of the second vulcanisation stage is caused by admitting vulcanisation fluid to the bladder 24, such as steam, nitrogen, a mixture thereof or any other suitable fluid, preferably steam and nitrogen, to a second pressure value included, just as an indication, between about 18 bars and about 30 bars, equal to about 27 bars for example, which is considerably higher than the first pressure value used during carrying out of the first vulcanisation stage. The high pressure created within the bladder 24 causes pressing of tyre 2 against the inner surface of mould 30, transmitting to the whole tyre the required heat for full cross-linking of same, i.e. a cross-linking sufficient to ensure the geometric and structural stability of tyre 2 in accordance with the design specifications.

Figure 6:
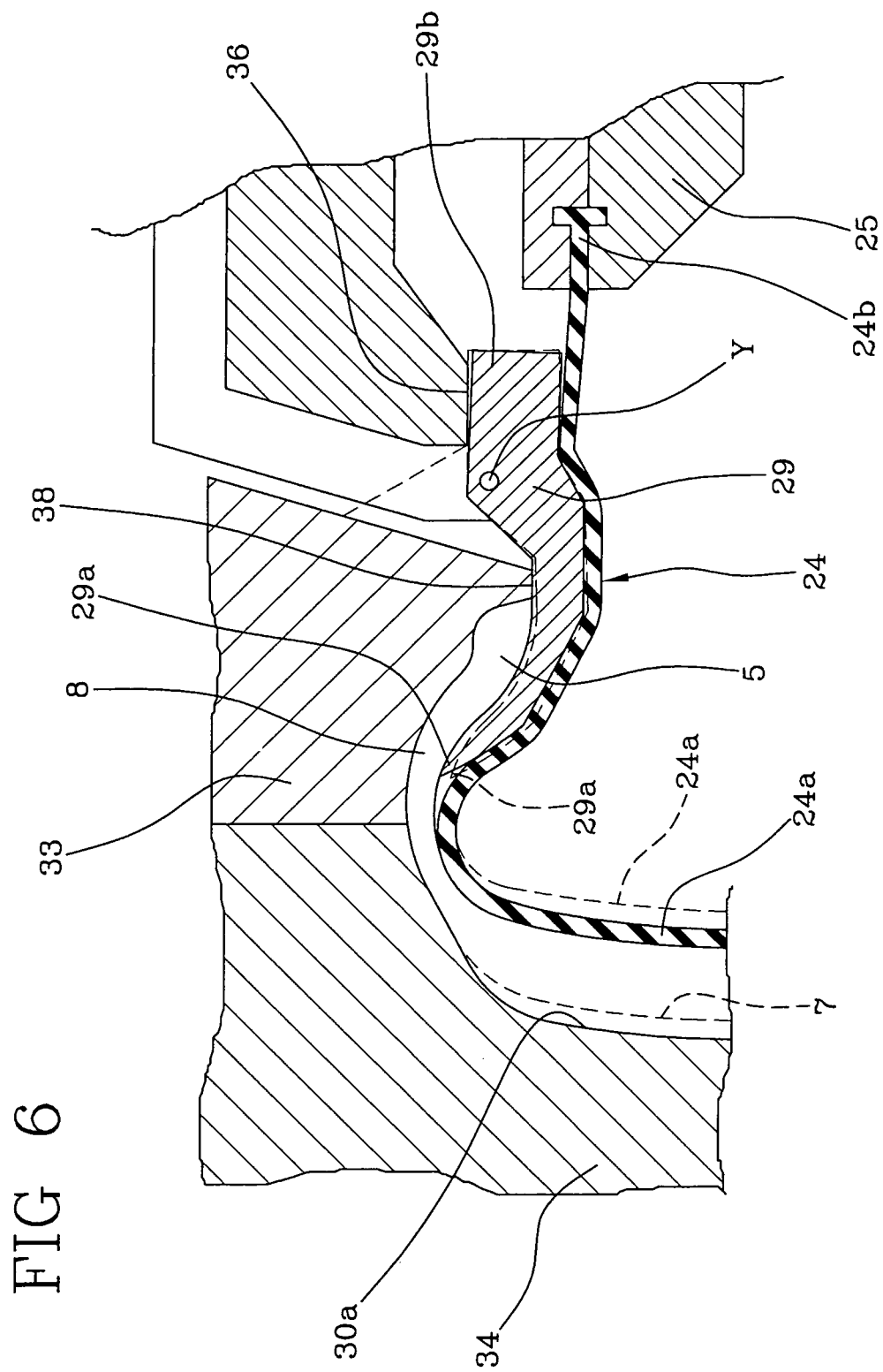
FIG. 6 is a view showing a detail seen in FIG. 5 to an enlarged scale.

The high pressure within the expandable bladder 24 during the second vulcanisation stage also gives rise to an additional pressing of the beads against the mould plates 33, by effect of the axial thrust transmitted by the bladder 24 to the counter-rings 28. It is to be pointed out in this connection that even after closure of mould 30, the counter-sectors 29 are preferably movable from the work position (in chain line in FIG. 6) to a maximum opened wide position, along a stroke included by way of indication between about 0.2 mm and about 1 mm, measured at the end edges 29a. Mobility of the counter-sectors 29 to the maximum opened wide position (in solid line in FIG. 6) enables an additional pressing of the beads 5 and the radially internal portions of the sidewalls 8 to be carried out to such an extend as to eliminate possible residual surface unevennesses. The additional pressing further enables the components of tyre 2 to be retained in a more efficient manner at the beads 5, counteracting the stresses induced by the radial expansion imposed to said tyre 2. Suitable stop seats 38 (FIG. 6) associated with the plates 33 of the vulcanisation mould 30 lend themselves to act against the counter-sectors 29 so as to stop opening wide of the same at the maximum opened wide position. Thus an excessive compression and deformation of the beads 5 and the radially internal portions of the sidewalls 8 is avoided.

In addition, the high pressure created in the bladder 24 during the pressing step, concurrently with the spring deformability of the bladder itself, ensures an efficient spreading of the elastomeric material constituting the inner surfaces of tyre 2, thus eliminating possible faults caused by laying of said material in the form of coils disposed close to each other, also in the radially external regions of tyre 2.

Adjustment of bladder 24 to the inner conformation of tyre 2 and subsequent separation at the end of vulcanisation can be advantageously assisted by a possible lubricating treatment to be carried out on the expandable toroidal support 23 before engagement of the latter at the inside of the built tyre 2. This lubricating treatment can be advantageously obtained by suitable devices operating on the expandable toroidal support 23 positioned externally of the vulcanisation mould 30, in order not to coat the surfaces of the mould 30 itself with the lubricating material in an undesirable manner.

The invention claimed is:

1. A method of manufacturing tyres comprising the steps of:
   building a green tyre on a rigid toroidal support externally having a forming surface of a conformation corresponding to an inner conformation of a built green tyre;
   removing the built green tyre from the rigid toroidal support;
   engaging the green tyre on an expandable toroidal support comprising at least one bladder;
   introducing the green tyre engaged on the expandable toroidal support into a vulcanisation mould; and
   curing the tyre enclosed in the vulcanisation mould,
   wherein curing the tyre comprises closing the vulcanisation mould to engage each bead of the tyre between a counter-ring carried by the expandable toroidal support and an inner surface of the vulcanisation mould.

2. The method as claimed in claim 1, wherein the rigid toroidal support is made up of a plurality of removably-engaged circumferential sectors disposed in mutual circumferential alignment relationship.

3. The method as claimed in claim 1, wherein said forming surface is substantially exempt from concavities or undercuts.

4. The method as claimed in claim 1, wherein the rigid toroidal support has bead seats axially spaced apart by a distance greater than 95% of a maximum axial distance measurable between axially opposite portions of the forming surface in parallel with a geometric axis of the toroidal support itself.

5. The method as claimed in claim 1, wherein engagement of the tyre on the expandable toroidal support comprises coaxially introducing the expandable toroidal support into the tyre with the bladder in a rest condition; and
   elastically expanding the bladder of the expandable toroidal support until the bladder acts against an inner surface of the tyre.

6. The method as claimed in claim 5, wherein expansion of the bladder is carried out by admission of a working fluid to a pressure of about 0.5 bar to about 1 bar.

7. The method as claimed in claim 1, wherein the step of curing the tyre comprises the step of pressing the tyre against an inner surface of the vulcanisation mould, thereby causing full cross-linking of the tyre.

8. The method as claimed in claim 1, wherein the step of curing the tyre comprises the step of consolidating beads of the tyre, causing a localised cross-linking at the beads themselves.

9. The method as claimed in claim 8, wherein the step of consolidating the beads has a duration of about 2 minutes to about 6 minutes.

10. The method as claimed in claim 8, comprising the step of admitting a vulcanisation fluid into the bladder to a first pressure value during the step of consolidating the beads.

11. The method as claimed in claim 10, wherein the first pressure value is about 1 bar to about 2.5 bars.

12. The method as claimed in claim 10, comprising the step of admitting steam into the bladder to a second pressure value higher than the first pressure value, during the pressing and full cross-linking steps of the tyre.

13. The method as claimed in claim 12, wherein the second pressure value is about 18 bars to about 30 bars.

14. The method as claimed in claim 1, wherein the beads of the tyre are urged against the counter-rings during closure of the mould.

15. The method as claimed in claim 14, wherein the beads of the tyre are subsequently pressed against the mould by effect of an axial thrust transmitted by the counter-rings during the pressing step.

16. The method as claimed in claim 1, wherein the expandable toroidal support is submitted to a lubricating treatment before the step of engaging the tyre on the expandable toroidal support.

17. The method as claimed in claim 16, wherein, while the lubricating treatment is being carried out, the expandable toroidal support is positioned externally of the vulcanisation mould.

18. The method as claimed in claim 1, wherein said building step takes place by forming at least one component of the tyre through winding up of an elongated element of elastomeric material into coils disposed close to each other and distributed along the forming surface of the rigid toroidal support.

19. The method as claimed in claim 1, wherein said building step takes place by forming at least one component of the tyre through laying of strip-like elements of elastomeric material in a mutually approached circumferential relationship on said rigid toroidal support, said strip-like elements comprising cords disposed parallel in side-by-side relationship.

20. The method as claimed in claim 1, wherein said building step takes place by forming at least one component of the tyre through laying of at least one continuous elongated element on said rigid toroidal support, which elongated element comprises at least one rubberised metal cord in the form of radially superposed coils.

21. The method as claimed in claim 1, wherein said building step is carried out by forming at least one component of the tyre through winding up on said rigid toroidal support of at least one reinforcing cord in a form of coils disposed axially close to each other in a crown portion of the tyre.

22. A method of manufacturing tyres, the method comprising:

building a green tyre on a rigid toroidal support externally having a forming surface of a conformation corresponding to an inner conformation of a built green tyre;

removing the built green tyre from the rigid toroidal support;

engaging the green tyre on an expandable toroidal support comprising at least one bladder and, before introducing the green tyre into a vulcanisation mould, elastically expanding the bladder of the expandable toroidal support until the bladder acts against an inner surface of the tyre;

introducing the green tyre engaged on the expandable toroidal support into the vulcanisation mould;

curing the tyre enclosed in the vulcanisation mould, the curing comprising consolidating beads of the tyre, causing a localized cross-linking at the beads; and admitting a vulcanisation fluid into the bladder to a first pressure value during the consolidating the beads.

* * * * *